B. H. SMITH.
PARCEL CARRYING VEHICLE.
APPLICATION FILED JUNE 4, 1917.
1,407,597. Patented Feb. 21, 1922.
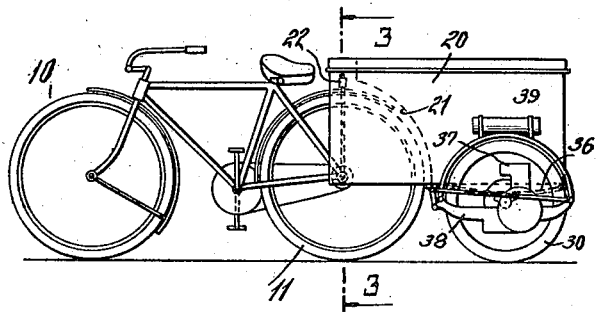
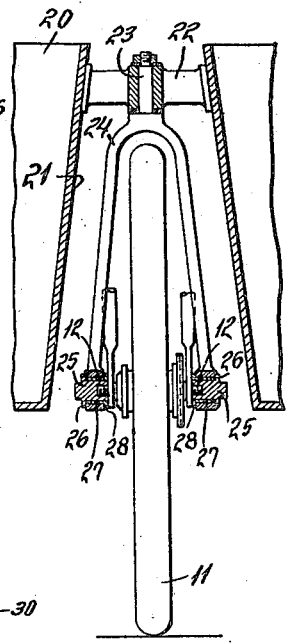
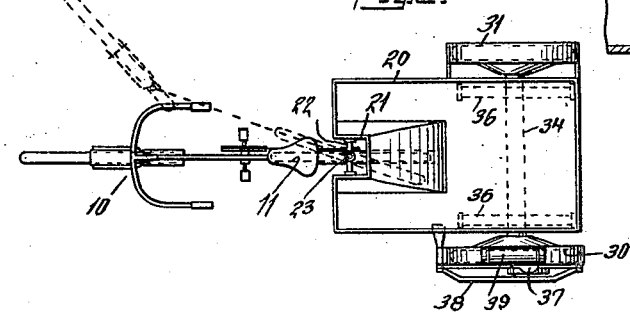
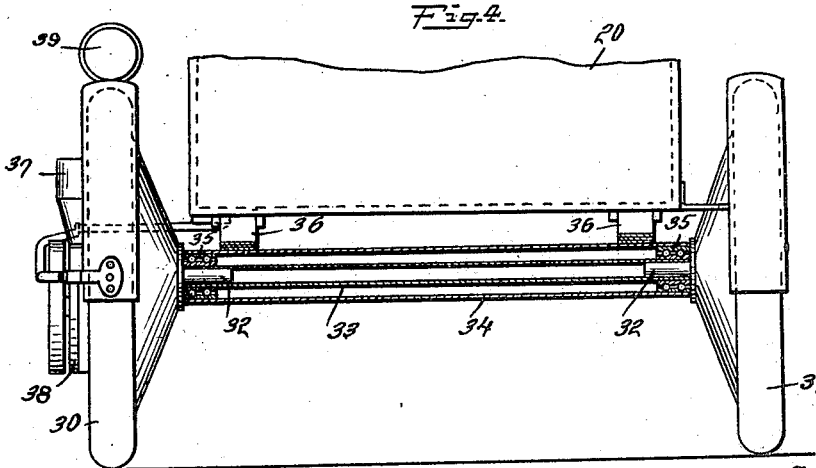
Inventor
Bronson H. Smith
By his Attorneys
Marshall E. Dearborn

UNITED STATES PATENT OFFICE.

BRONSON H. SMITH, OF BROOKLYN, NEW YORK, ASSIGNOR, BY MESNE ASSIGNMENTS, TO DELMORE MANUFACTURING COMPANY, INCORPORATED, A CORPORATION OF NEW YORK.

PARCEL-CARRYING VEHICLE.

1,407,597.  Specification of Letters Patent.  Patented Feb. 21, 1922.

Application filed June 4, 1917. Serial No. 172,569.

*To all whom it may concern:*

Be it known that I, BRONSON H. SMITH, a citizen of the United States of America, and a resident of Brooklyn, Kings County, and State of New York, have invented certain new and useful Improvements in Parcel-Carrying Vehicles, of which the following is a specification, reference being had to the accompanying drawings, forming a part thereof.

My invention relates to improvements in parcel carrying vehicles, and its object is to provide a simple and inexpensive motor driven vehicle especially adapted to the use of delivering small and light parcels. More specifically it relates to an attachment for bicycles which comprises a motor driven parcel container and connecting mechanism by means of which it may be readily attached to or removed from a bicycle of ordinary construction without requiring structural modifications of the latter.

Another object is to so construct the device that it will freely follow the course of the bicycle to which it is attached around curves and over uneven ground.

In order that my invention may be thoroughly understood, I will now proceed to describe the same in the following specification, and then point out the novel features thereof in appended claims.

Referring to the drawings:

Figure 1 is a side elevation of a bicycle with my apparatus attached thereto.

Figure 2 is a plan view of the same parts.

Figure 3 is a sectional end elevation of the device on a larger scale, the section being taken on the line 3—3 of Figure 1, and with some of the parts shown in full elevation.

Figure 4 is a rear elevation of the device with some of the parts shown in section, in order to more clearly illustrate their construction.

Like characters designate corresponding parts in all the figures.

10 designates a bicycle, and 11 the rear wheel thereof, and 12 the threaded ends of its rear axle.

20 designates a rectangular body, the central front part of which is cut back as shown at 21 far enough to clear the wheel 11 of the bicycle, and the recess thus formed is of sufficient width to permit the body to turn relatively to the bicycle as shown by the dotted line position of the bicycle in Figure 2. 22 is a rigid bracket which bridges the recess 21 near its upper forward part. This forms a bearing for a vertical spindle 23 which projects upwardly from a fork 24 which straddles the wheel 11 and the lower ends of which are supported on the axle of this wheel in the manner which I will now describe.

The nuts which are found on the threaded ends 12 of the axle of wheel 11 are removed and are replaced by special threaded bearing members 25. These are constructed with flanges 26. A collar 27 provided with a flange 28 fits over each of these bearing members. The ends of the fork 24 are constructed with bearings which fit over these collars and between the flanges 26 and 28. By this simple expedient a connection is made between the body 20 and the bicycle 10 which permits the body to articulate about the axis of the wheel 11 and also about the axis of the spindle 23.

The body 20 is further supported upon wheels 30 and 31. Each of these wheels has a rigid axle such as 32 and these axles are affixed to opposite ends of a tubular shaft 33. 34 is an outer tubular shaft and 35 are ball bearings between these two shafts. 36 designates springs which connect the body 20 with the outer shaft 34.

The wheel 30 is what is commonly called a "motor wheel" and comprises an internal combustion engine 37 supported on a bracket 38 which is suitably connected with the body 20. The power shaft of the engine is also connected with the wheel 30 by suitable gearing which is not shown as it forms no part of this invention. 39 is a fuel tank. It is obvious that the control wires which are a part of the usual equipment of a motor wheel may be led up to the handles of the bicycle.

No extended description of this apparatus is necessary. It is clear that the engine will drive both of the wheels 30 and 31 and will consequently drive the bicycle. The operator steers the bicycle in the usual manner and the attachment will follow. The articulation about the axis of the spindle 23 permits the apparatus to turn on a curve of as short radius as can be taken conveniently by the bicycle alone. The articulation about the axis of wheel 11 permits the apparatus to go up and down over obstructions or inequalities in the road. In fact, the connecting mechanism is capable of functioning as a universal joint. During any of the various positions of the connecting mechanism the driving power of the motor is available to push the parcel carrying body and the bicycle in front of it.

The attachment may be readily removed from the bicycle, and as the latter is not structurally modified in any way, it may be used separately whenever desired.

I have shown and described what I now consider a preferred embodiment of my invention, but do not intend to limit myself to any specific form or construction,—in fact I intend no limitation other than those imposed by the appended claims.

What I claim is:

1. A receptacle adapted to be connected with the axle of the propelled wheel of a bicycle, a pair of wheels at the sides thereof, a motor connected to drive at least one of said wheels and means vertically pivoted to the receptacle for connecting the receptacle with a bicycle.

2. A receptacle adapted to be connected with a bicycle, a pair of wheels at the sides thereof, a motor connected to drive said wheels and means vertically pivoted to the receptacle for connecting the receptacle with the axle of the propelled wheel of a bicycle.

3. The combination with a bicycle, of a parcel-carrying and propelling attachment therefor comprising a parcel receptacle constructed with a recess in its forward part to receive the rear wheel of the bicycle and provided at such forward part with means for flexibly connecting the same with the frame of the bicycle, a pair of wheels at the sides of the receptacle and a motor connected to drive at least one of said wheels.

4. A receptacle constructed with a recess in its forward part to permit said part of the receptacle to be placed over the rear part of a bicycle, a frame arranged to have a horizontal pivotal connection with a bicycle, a vertical pivotal connection between said frame and the receptacle, a pair of wheels at the sides of the receptacle, and a motor connected to drive at least one of said pair of wheels.

5. A receptacle constructed with a recess in its forward part to permit said part of the receptacle to be placed over the rear part of a bicycle, a fork adapted to straddle the rear wheel of a bicycle, bearings near the ends of said forks arranged to be connected with the axle of the rear wheel of the bicycle, a spindle projecting upwardly from said fork, a bearing member for the spindle affixed to said receptacle, a pair of wheels at the sides of the receptacle, and a motor connected to drive at least one of said pair of wheels.

6. A receptacle constructed with a recess in its forward part to permit said part of the receptacle to be placed over the rear part of a bicycle, a fork adapted to straddle the rear wheel of a bicycle, bearings near the ends of said forks arranged to be connected with the axle of the rear wheel of the bicycle, a spindle projecting upwardly from said fork, a member extending transversely across the upper part of said recess and affixed to the opposite walls thereof, a central vertical bearing in said member adapted to receive the spindle, a pair of wheels at the sides of the receptacle, and a motor connected to drive at least one of said pair of wheels.

7. A parcel-carrying and propelling attachment for bicycles comprising a parcel receptacle constructed to fit the rearward portion of a bicycle and provided with means for detachably and flexibly connecting the same with the frame of the bicycle, supporting wheels at the sides of said receptacle and a motor connected to drive at least one of said wheels.

8. A receptacle constructed with a recess in its forward part to permit said part of the receptacle to be placed over the rear part of a bicycle, means for flexibly connecting said receptacle with a bicycle, a pair of wheels at the sides of the receptacle, and a motor and driving gearing incorporated with one of said wheels.

9. A receptacle constructed with a recess in its forward part to permit said part of the receptacle to be placed over the rear part of a bicycle, a fork adapted to straddle the rear wheel of a bicycle, bearings near the ends of said forks arranged to be connected with the axle of the rear wheel of the bicycle, a spindle projecting upwardly from said fork, a bearing member for the spindle affixed to said receptacle, a pair of wheels at the sides of the receptacle, and a motor and driving gearing incorporated with one of said wheels.

10. A receptacle constructed with a recess in its forward part to permit said part of the receptacle to be placed over the rear part of a bicycle, a fork adapted to straddle the rear wheel of a bicycle, bearings near the ends of said forks arranged to be connected with the axle of the rear wheel of the bicycle, a spindle projecting upwardly from said fork, a member extending transversely across the upper part of said recess and affixed to the oposite walls thereof, a central vertical bearing in said member adapted to receive the spindle, a pair of wheels at the sides of the receptacle, an axle forming a driving connection between said wheels, and a motor and driving gearing incorporated with one of said wheels.

11. A parcel receptacle adapted to be connected with a bicycle, a fork arranged to straddle the rear wheel of the bicycle, bearings near the ends of said fork adapted for engagement with the axle of such rear wheel, an upwardly projecting spindle carried by said fork, a bearing member on the receptacle engaged with said spindle and a motor driven wheel connected with the receptacle.

In witness whereof, I have hereunto set my hand this 28 day of May, 1917.

BRONSON H. SMITH.